(12) United States Patent
Xiang

(10) Patent No.: US 8,767,550 B2
(45) Date of Patent: Jul. 1, 2014

(54) METHOD AND PATH COMPUTATION ELEMENT FOR IMPROVING SERVICE RESTORATION SPEED IN TRANSMISSION NETWORK

(75) Inventor: Xiaoshan Xiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 237 days.

(21) Appl. No.: 13/258,147

(22) PCT Filed: Apr. 27, 2010

(86) PCT No.: PCT/CN2010/072256
§ 371 (c)(1),
(2), (4) Date: Feb. 17, 2012

(87) PCT Pub. No.: WO2011/022982
PCT Pub. Date: Mar. 3, 2011

(65) Prior Publication Data
US 2012/0134263 A1    May 31, 2012

(30) Foreign Application Priority Data

Aug. 25, 2009  (CN) .......................... 2009 1 0168864

(51) Int. Cl.
*H04L 12/26*    (2006.01)
(52) U.S. Cl.
USPC ...................................................... 370/235
(58) Field of Classification Search
CPC ...... H04L 41/085; H04L 12/56; H04L 12/569
USPC .............. 370/216, 225, 228, 230, 230.1, 231, 370/235, 236.1, 237
See application file for complete search history.

(56) References Cited

U.S. PATENT DOCUMENTS 6,151,304 A * 11/2000 Doshi et al. .................... 370/238
2004/0004937 A1    1/2004 Skalecki et al.
2009/0228575 A1 * 9/2009 Thubert et al. ................ 709/220

FOREIGN PATENT DOCUMENTS

| CN | 1870570 A | 11/2006 |
| CN | 101237399 A | 8/2008 |
| CN | 101286892 A | 10/2008 |
| CN | 101645847 A | 2/2010 |
| JP | 2002354038 A | 12/2002 |
| JP | 2004248166 A | 9/2004 |
| JP | 2005039362 A | 2/2005 |

(Continued)

OTHER PUBLICATIONS

International Search Report in international application No. PCT/CN2010/072256, mailed on Jul. 15, 2009.

(Continued)

*Primary Examiner* — Raj Jain
(74) *Attorney, Agent, or Firm* — Oppedahl Patent Law Firm LLC

(57) ABSTRACT

The disclosure provides a method for improving a service restoration speed in a transmission network, comprising: in a service set-up process, the PCE receives a route computation request including restoration attributes and constraint conditions from a Path Computation Client (PCC), and computes and saves the restoration routes available for the service according to the constraint conditions; and, when receiving the restoration route computation request for the service from the PCC, the PCE selects a route from the restoration routes locally saved and available for the service according to the selection conditions included in the restoration route computation request and sends it to the PCC which restores the service by the received route. The disclosure further provides a PCE.

14 Claims, 4 Drawing Sheets

(56) References Cited

FOREIGN PATENT DOCUMENTS

| | | |
|---|---|---|
| JP | 2006060850 A | 3/2006 |
| JP | 2007049336 A | 2/2007 |
| JP | 2007228191 A | 9/2007 |
| WO | 2004006514 A1 | 1/2004 |
| WO | 2007065301 A1 | 6/2007 |

OTHER PUBLICATIONS

English Translation of the Written Opinion of the International Search Authority in international application No. PCT/CN2010/072256 mailed on Jul. 15, 2009.

* cited by examiner

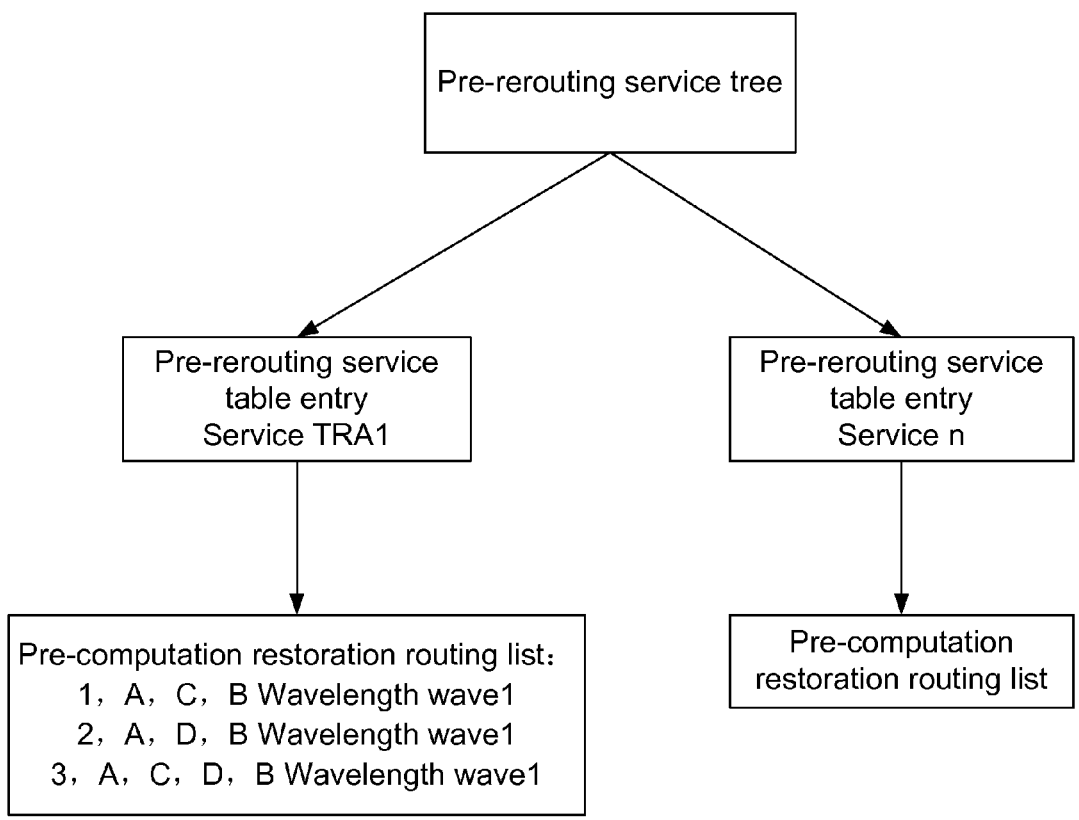
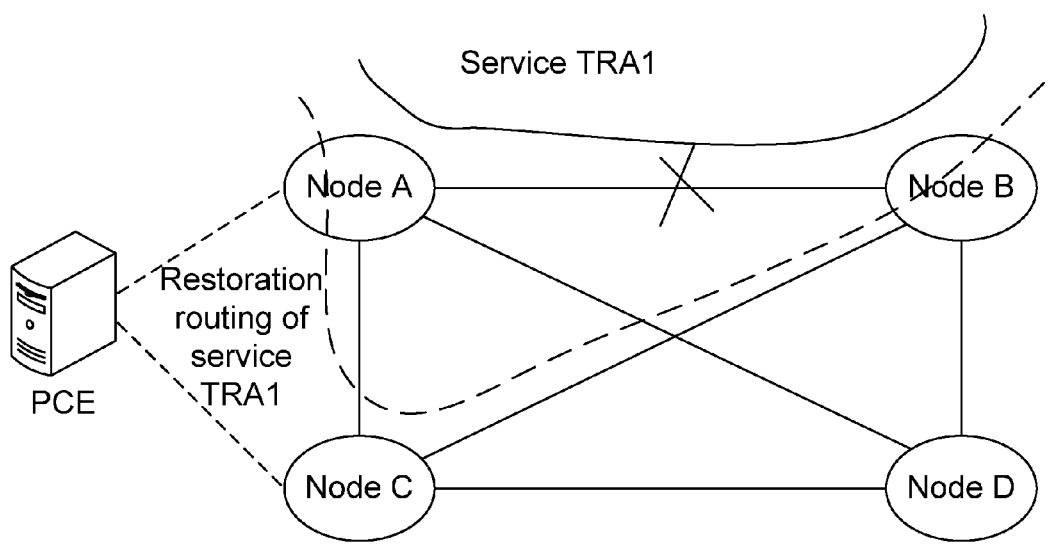

METHOD AND PATH COMPUTATION ELEMENT FOR IMPROVING SERVICE RESTORATION SPEED IN TRANSMISSION NETWORK

TECHNICAL FIELD

The disclosure relates to a communication technology, in particular to a method and a path computation element for improving a service restoration speed in a transmission network.

BACKGROUND

Along with the continuous development of the transmission network, the network topology is becoming more complicated and the traffic is increasing. It is commonly believed in the industry that the Automatically Switched Optical Network (ASON) is the development target of the transmission network, and due to the development of the ASON, the transmission network is gradually developed from the conventional single link is providing function to a network platform which is intelligentized to meet various service requirements. With intelligence and automation, the ASON can provide a restoration protection measure besides the Automatic Protection Switched (APS), thereby improving the utilization rate of the network bandwidth.

At present, the centralized end-to-end restoration mode is generally adopted. After receiving an alarm, a Connection Controller (CC) judges the alarm type (such as a channel alarm, and a multiplex section alarm) and the alarm location, and then determines whether to restore the alarm according to the route policy and service quality requirement of an integrated service (service); if restoring is need, the CC will request the Route Controller (RC) to compute the restoration connection route according to the constraint conditions (such as fault location), current network state, and route policy. After the RC computes the restoration route, the CC will set up a restoration connection Label Switched Path (LSP) according to the explicit route. According to complexity of the network topology and different characteristics of transmission networks (such as a Multi-Protocol Label Switching (MPLS), a Synchronous Digital Hierarchy (SDH), a Wavelength Division Multiplexing (WDM)), the complexity of route computation is also different. However, no matter under what condition, the route computation is always very complex and time-consuming, particularly under the condition of a very big network size and a very complex constraint condition.

SUMMARY

The technical problem to be solved by the disclosure is to provide a method and a Path Computation Element (PCE) for improving a service restoration speed in a transmission network, in order to overcome the defects that the restoration route computation is very time-consuming and complex in the prior art.

In order to solve the problem, the disclosure provides a method for improving a service restoration speed in a transmission network, which includes that:

in a service set-up process, the PCE receives a route computation request including restoration attributes and constraint conditions from a Path Computation Client (PCC), and computes and saves the restoration routes available for the service according to the constraint conditions; and when receiving a restoration route computation request for the service from the PCC, the PCE selects a route from the restoration routes locally saved and available for the service according to selection conditions included in the restoration route computation request and sends the route to the PCC which restores the service via the received route.

The method further includes that: the PCE further saves the constraint conditions; and after receiving the restoration route computation request from the PCC, if no local restoration route which meets the selection conditions is available for the service, the PCE re-computes restoration routes available for the service according to the selection conditions and the constraint conditions locally saved.

The PCE is preset with a pre-rerouting service tree; and the method further includes that: the PCE saves the corresponding relationship between service identifier information of the service and the computed restoration routes available for the service in the pre-rerouting service tree.

The step of the PCE saving the restoration routes available for the service includes that:

after obtaining the restoration routes available for the service through computation, the PCE creates a list for pre-computed restoration routes, and saves the restoration routes available for the service in the list; and the step of the PCE saving the corresponding relationship between the service identifier information of the service and the computed restoration routes available for the service in the pre-rerouting service tree includes that: the PCE saves the corresponding relationship between a head of the list for the pre-computed restoration routes and the service identifier information of the service in the pre-rerouting service tree by taking the corresponding relationship as a pre-rerouting service table entry.

The method further includes: when receiving multiple restoration route computation requests, the PCE processes the multiple restoration route computation requests according to a priority order of the services related to the multiple restoration route computation requests.

The method further includes: when a network topology is changed, the PCE actively updates the restoration routes locally saved and available for each service.

The step that the PCE actively updates the restoration routes locally saved and available for each service includes: after receiving a notification message of updating a network topology or updating a link resource, the PCE re-computes the restoration routes available for services related to the updated link resource in the restoration routes locally saved and available for each service, and saves the re-computed restoration is routes available for each service, wherein the PCE re-computes the restoration routes according to the locally saved constraint conditions of corresponding services and updating information of the link resource.

The method further includes: when re-computing the restoration routes available for multiple services, the PCE computes the restoration routes according to the priority order of the services.

The disclosure further provides a PCE supporting the improvement of the service restoration speed in a transmission network, which is configured to:

in a service set-up process, receive a route computation request including restoration attributes and constraint conditions from a Path Computation Client (PCC), then compute and save the restoration routes available for the service according to the included constraint conditions; and when a restoration route computation request for the service from the PCC is received, select a route from the restoration routes locally saved and available for the service according to the selection conditions included in the restoration route computation request, and send the route to the PCC which restores the service via the received route.

The PCE is further configured to save the constraint conditions, and re-compute the restoration routes available for the service according to the selection conditions and the locally-saved constraint conditions of the service if no local restoration route which meets the selection conditions is available for the service after receiving the restoration route computation request from the PCC.

The PCE is further configured to save a corresponding relationship between identifier information of the service and the computed restoration routes available for the service in a pre-rerouting service tree.

The PCE is configured to, after obtaining the restoration routes available for the service through computation, create a list for pre-computed restoration routes and save the computed result to the list, and save a corresponding relationship between a head of the list and the service identifier information of the service in the pre-rerouting service tree by taking the corresponding relationship as a pre-rerouting service table entry.

The PCE is further configured to, when multiple restoration route computation requests are received, process the multiple restoration route computation requests according to a priority order of the services related to the multiple restoration route computation requests.

The PCE is further configured to actively update the restoration routes locally saved and available for each service when a network topology is changed.

The PCE is further configured to, after receiving a notification message of updating a network topology or updating a link resource, re-compute the restoration routes available for services of the updated link resource related to the restoration routes locally saved and available for each service, according to the locally saved constraint conditions of corresponding services and updating information of the link resource, and save the re-computed restoration routes available for each service.

The PCE is further configured to, when re-computing the restoration routes available for multiple services, compute restoration routes available for the services according to a priority order of the services.

Through the disclosure, the restoration efficiency of the service can be obviously improved, and the route computation time for the restoration of many services caused by a network fault is reduced.

BRIEF DESCRIPTION OF THE DRAWINGS

FIG. 3 is a diagram showing the structure of a pre-rerouting service tree obtained by computation in one embodiment of the disclosure;

FIG. 4 is a diagram showing the structure of a network topology after a service link is disconnected in one embodiment of the disclosure;

DETAILED DESCRIPTION

The technical solution of the disclosure is detailed below in conjunction with the drawings and embodiments.

The basic conception of the method is: in a service set-up process, after receiving is a route computation request including restoration attributes and constraint conditions from a Path Computation Client (PCC) (the CC, for example), the Path Computation Element (PCE) (the RC, for example) computes the restoration routes available for the service according to the constraint conditions and saves the computation result; and when receiving the restoration route computation request for the service from the PCC, the PCE selects a route from the restoration routes locally saved and available for the service according to the selection conditions included in the request and sends the route to the PCC which restores the service via the received route.

After receiving the route computation request, the PCE further needs to compute the route of the service according to the constraint conditions and return it to the PCC; and the PCC sets up a service path according to the received route.

The PCE is preset with a pre-rerouting service tree; and the PCE saving the computed restoration routes available for the service comprises that: the PCE saves the corresponding relationship between the service identifier information of the service and the computed restoration routes available for the service in the pre-rerouting service tree.

Figure 1:
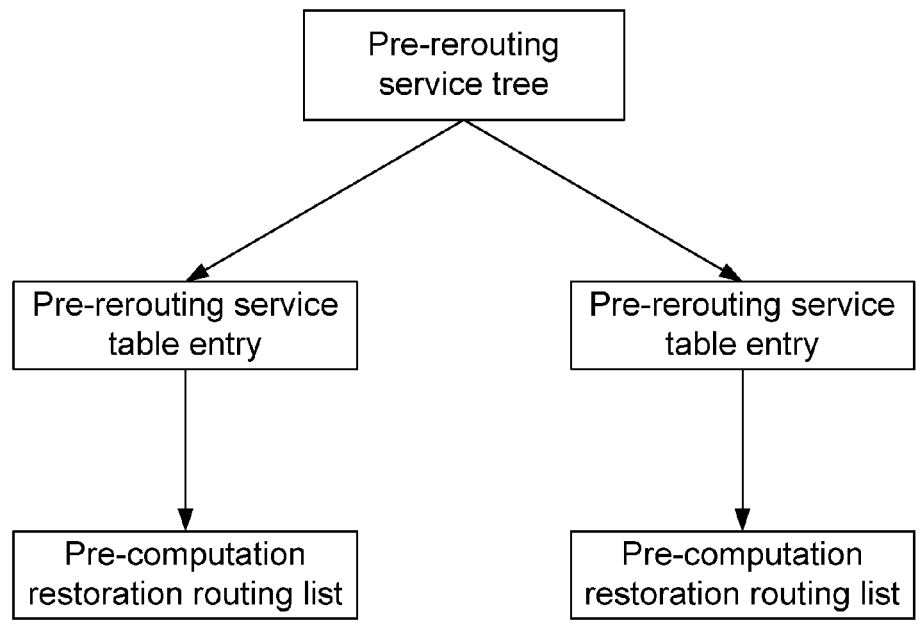
FIG. 1 is a diagram showing the structure of a pre-rerouting service tree in one embodiment of the disclosure.

To make the saving more convenient, after the restoration routes available for the service are computed, a list for pre-computed restoration routes can be created, and the computation result is saved in the list; then, the corresponding relationship between the head of the list and the service identifier information of the service is saved in the pre-rerouting service tree as a pre-rerouting service table entry, and the structure of the pre-rerouting service tree is as shown in FIG. 1. When receiving the restoration route computation request, the PCE can find the head of the list for pre-computed restoration routes corresponding to the service in the pre-rerouting service tree according to the service identifier information included in the request, so as to obtain the restoration routes available for the service from the list for pre-computed restoration routes.

In addition, the PCE further needs to save the constraint conditions of the service besides the computed restoration routes available for the service. If failing to find a local available restoration route which meets the selection condition after receiving the restoration route computation request from the PCC, the PCE would re-compute the restoration routes according to the selection conditions and the locally saved constraint conditions of the service.

The priorities of the services are the service attributes set by the management platform; and the route computation request from the PCC to the PCE includes the is priority information of the services. The route request for creating a route includes the priority information, so the PCE could save the priority information and could obtain subsequently the priories of each service according to the saved priority information. Due to some changeable service priorities, or for the unified flow, the PCC will contain the information of the service priorities each time sending a route request (including a route computation request, restoration route computation request etc.).

The PCE may receive multiple restoration route computation requests within a short time but cannot process the restoration route computation requests at the same time, so it can process the restoration route computation requests according to the priority order of the services related to the restoration route computation requests. By one method, the received restoration route computation requests can be placed into a queue where the restoration routes wait for computation according to the priority order of the services related thereto, and the requests corresponding to the services having higher priorities in the queue are processed preferentially.

When a network topology is changed, the PCE needs to actively update the restoration routes saved locally and available for each service, which specifically comprises that: after receiving a notification message of updating a network topology or updating a link resource, the PCE traverses the pre-rerouting service tree, re-computes the available restoration routes for the services related to the updated link resource in the available restoration routes, and updates the computation result to the pre-rerouting service tree, wherein the PCE performs the re-computation according to the locally saved constraint conditions of corresponding services and the updating information of the link resource.

Similarly, when a network topology is changed, the PCE may need to re-compute the restoration routes available for multiple services; and when re-computing the restoration routes available for the services, the PCE computes the restoration routes available for the services according to the priority order of the services. By another method, when traversing the pre-rerouting service tree, the PCE can place the computation request for the restoration routes needing re-computing and corresponding to services into a queue where active restoration routes wait for computation according to the priority order of the services, and preferentially process the requests having higher priorities in the queue.

Correspondingly, the disclosure further provides a system for improving the service restoration speed in a transmission network, which includes a PCE and a PCC.

The PCC is used for sending a route computation request including restoration attributes and constraint conditions to the PCE in a service set-up process, for sending a restoration route computation request for a service which needs restoring to the PCE, and for restoring the service via the received restoration route; and the PCE is used for, after receiving a route computation request, computing the restoration routes available for the service according to the constraint conditions included in the request and saving the computation result; and further for, when receiving a restoration route computation request for the service from the PCC, selecting a route from the restoration routes locally saved and available for the service according to the selection conditions included in the request and sending the route to the PCC.

In addition, the PCE is further used for, after receiving the route computation request, computing a route of the service according to the constraint conditions and returning the route to the PCC; and the PCC is further used for setting up a service path according to the received route.

The PCE is further used for saving the constraint conditions besides the computed restoration routes available for the service, and further for re-computing the available restoration routes according to the selection conditions and the locally-saved constraint conditions of the service if failing to find a local available restoration route which meets the selection conditions after receiving the restoration route computation request from the PCC.

The PCE is preset with a pre-rerouting service tree; and the PCE is used for saving the computed restoration routes available for the service by saving the corresponding relationship between the identifier information of the service and the computed restoration routes available for the service in the pre-rerouting service tree.

To save the computed restoration routes available for the service, the PCE is used for, after computing the restoration routes available for the service, creating a list for pre-computed restoration routes and saving the computation result in the list; and further for saving the corresponding relationship between the head of the list and the identifier information of the service in the pre-rerouting service tree by taking the relationship as a pre-rerouting service table entry.

To search for a restoration route when receiving a restoration route computation request for the service from the PCC, the PCE is used for finding the head of the list for the pre-computed restoration routes corresponding to the service in the pre-rerouting service tree according to the service identifier information included in the restoration route computation request, and further for selecting a route from the available restoration routes saved in the list according to the selection conditions and sending it to the PCC.

The PCE is further configured to actively update the restoration routes saved locally and available for each service when a network topology is changed.

The PCE is further used for, when receiving restoration route computation requests for the service from the PCC, placing the restoration route computation requests in a queue where the restoration routes wait for computation according to the priorities of the related services.

To actively update the restoration routes locally saved and available for each service when a network topology is changed, the PCE is used for:

after receiving a notification message of updating a network topology or updating a link resource, traversing the pre-rerouting service tree, re-computing the available restoration routes for the services related to the updated link resource in the available restoration routes, and updating the pre-rerouting service tree with the computation result to, wherein the PCE performs the re-computation according to the locally-saved constraint conditions of corresponding services and the updating information of the link resource.

The PCE is further configured to, when re-computing the restoration routes available for multiple services, compute the restoration routes according to the priority order of the services.

To re-computing the available restoration routes for the services of the updated link resource related to the available restoration routes, the PCE is used for, when traversing the pre-rerouting service tree, placing the restoration route computation requests corresponding to the service needing re-computing in a queue where the restoration routes wait for computation according to the priorities of the services related thereto and preferentially computing the requests having higher priorities in the queue.

The technical solution of the disclosure is further described below in conjunction with the embodiments.

Figure 2:
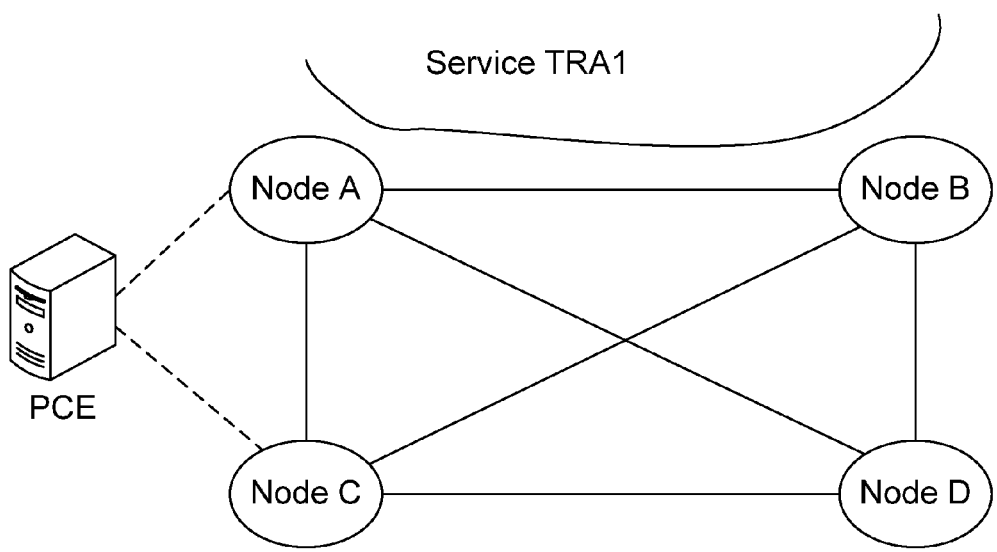
FIG. 2 is a diagram showing the structure of a network topology in one embodiment of the disclosure.

As shown in FIG. 2, it is assumed that the network is the Wavelength Switched Optical Network (WSON), wherein the network has a PCE which has two links accessing to the network so as to ensure a higher communication reliability; and all other nodes (A, B, C, D) are PCCs which know the existence of the PCE. A service TRA1 is to be set up from A to B, which has restoration attributes (i.e., it needs to be restored when the connection of the service is failed). The procedure includes the following steps:

Step 21: The node A, as a PCC, sends a route computation request to the PCE. The route computation request includes the identifier information of the service TRA1 from A to B (for example, using a triple tTraId={A, B, service id} as sole identifier of the service), and includes an identifier FlgRestore representing the restoration attributes of the service, and other constraint conditions of computing the restoration routes.

Step 22: After receiving the route computation request from the node A, the PCE computes a route and a wavelength, such as a route {A, B} and a wavelength Wave1, and then returns the result to the PCC (i.e., node A).

Step 23: The PCE knows that the service has restoration attributes by parsing the restoration attribute identifier in the route computation request, so it sets up a pre-rerouting service table entry with the identifier information tTraId of the service as an index for the service in a pre-rerouting service tree (such as g_tReRouteTraTree), and constraint conditions for the computation of the restoration routes are also included, and then computes all possible restoration routes in the network topology. For the service TRA1, it is assumed that the possible restoration routes include: restoration route {A, C, B}, wavelength Wave 1; restoration route {A, D, B}, wavelength Wave 1; and restoration route {A, C, D, B}, wavelength Wave 1. Then the available restoration routes are saved in a list for pre-computed restoration routes in a pre-rerouting service table entry of the service, and the specific structure of the pre-rerouting service tree is as shown in FIG. 3.

Figure 5:
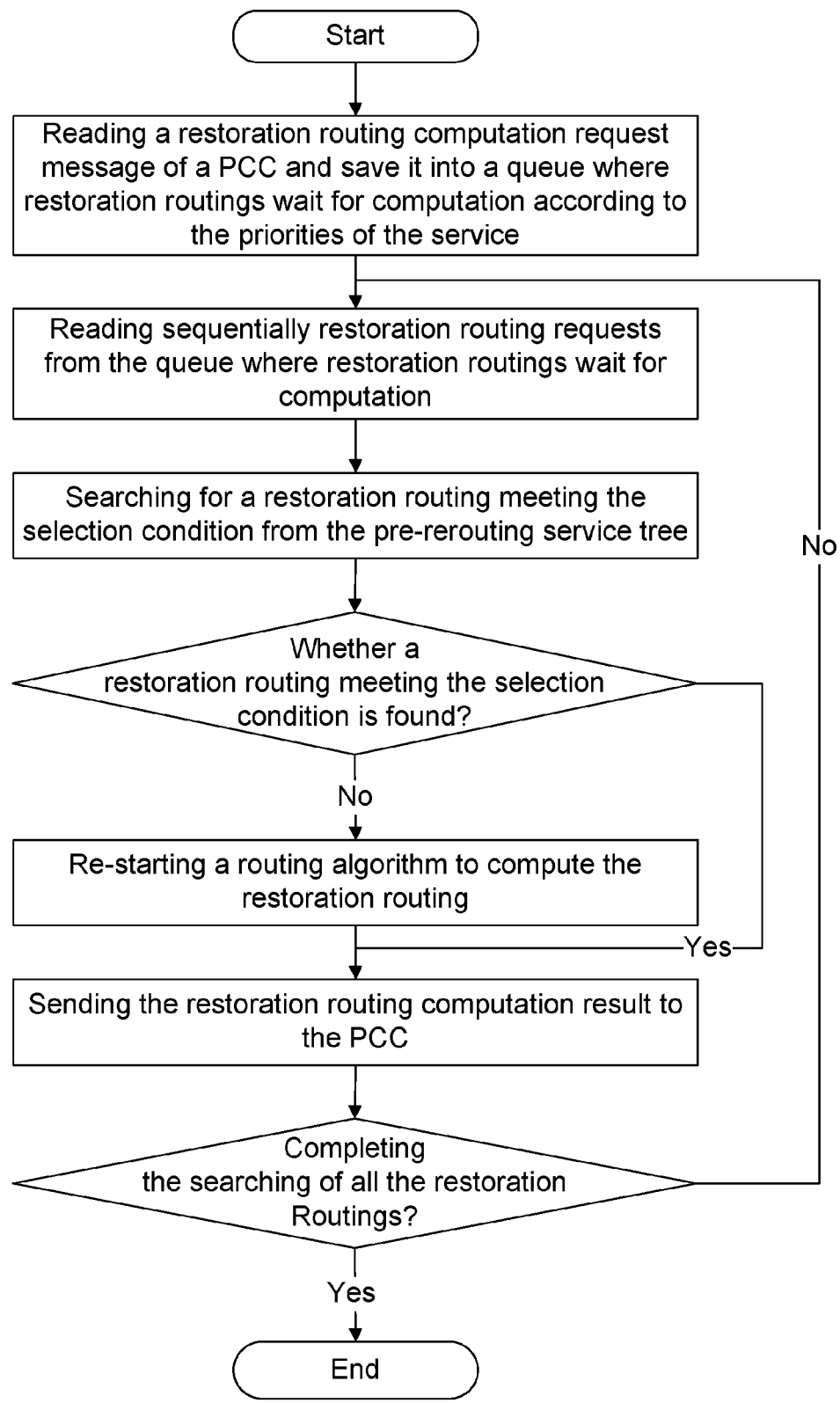
FIG. 5 is a flowchart of service restoration in one embodiment of the disclosure.

It is assumed that the link between the A and B goes wrong at a certain moment (it is also assumed that no other services are set up neither faults happen, such as fiber cuts, in the network before the moment), such as fiber cuts, as shown in FIG. 4. The node A detects that the service TRA1 goes wrong, and locates that the fault is caused by the failed link between the A and B, so the node A starts the route restoration process, as shown in FIG. 5, specifically:

Step 31: The node A, as a PCC, sends a restoration route computation request to the PCE, and points out that the failed link is the one between the A and B in a message, wherein the request includes the identifier tTraId={A, B, service id} of the TRA1 and the priority of the service.

Step 32: After receiving the restoration route computation request, the PCE inserts the restoration route computation request in a queue g_tRstrRtCompQue where restoration routes wait for computation according to the priorities of the services at first, wherein it is assumed that only the restoration route computation request of the node A is in the queue.

Step 33: The PCE reads the restoration route computation request of the node A from the queue g_tRstrRtCompQue where restoration routes wait for computation, parses the service identifier tTraId from the restoration route computation request at first, and then searches for the pre-rerouting table entry corresponding to the service in the pre-rerouting service tree g_tReRouteTraTree according to the service identifier tTraId. Obviously, the PCE can find the pre-rerouting table entry corresponding to the service TRA1 very fast, and then can search for available restoration routes in the list for the available restoration routes in the table entry according to the fault location (i.e., searching condition) in the restoration route computation request, including:

if an available restoration route is found, such as selecting the restoration route {A, C, B} and the wavelength Wave1 as the restoration route of the service TRA1, the PCE composes a restoration route response message and returns it to the node A; and if no available restoration route is found, the PCE re-starts a route algorithm to compute the restoration route and returns the computed restoration route to the node A through the restoration route response message.

The node A can restore a service after receiving the restoration route response message.

Step 34: The PCE continues to read a next restoration route computation request from the queue g_tRstrRtCompQue where the restoration routes wait for computation, and ends the operation when finding that the queue is empty.

Figure 6:
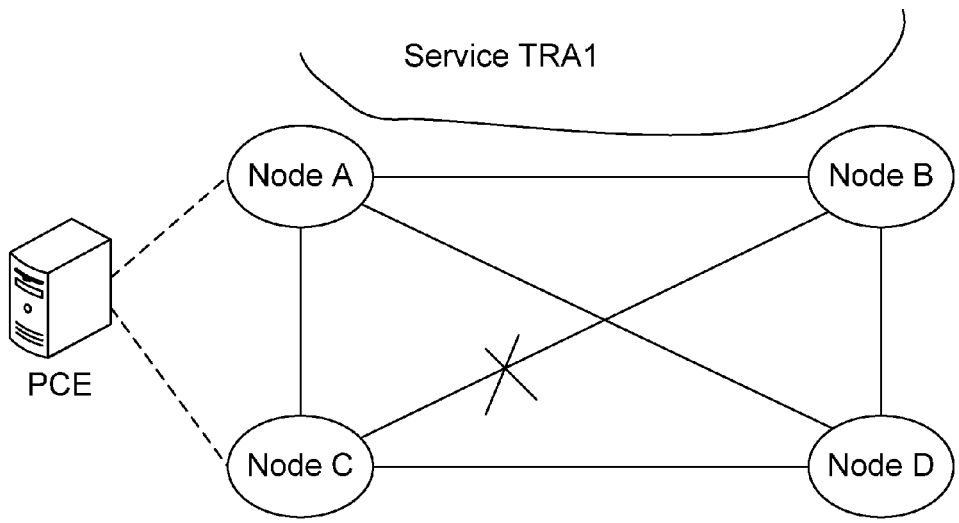
FIG. 6 is a diagram showing the structure of a changed network topology in one embodiment of the disclosure.

In the embodiment, a service TRA1 from A to B has been set up, and the PCE has set up a corresponding pre-rerouting table entry in the pre-rerouting service tree g_tReRouteTraTree for the service. It is assumed that the link between the C and B goes wrong at a certain moment (it is also assumed that no other services are set up neither faults happen, such as fiber cuts, in the network before the moment), such as fiber cuts, as shown in FIG. 6, then the PCE will receive a link resource updating notification and perform as follows:

Step 41: after receiving a link state updating notification including the disconnected link between the B and C, the PCE traverses the whole pre-rerouting service tree g_tReRouteTraTree and saves each service containing the updated link resource in the available restoration route information in a queue g_tSpontRstrRtCompQue where active restoration routes wait for computation. The available restoration routes of the service TRA1 include the route from node B to node C, so the service TRA1 needs to re-compute the available restoration routes.

Figure 7:
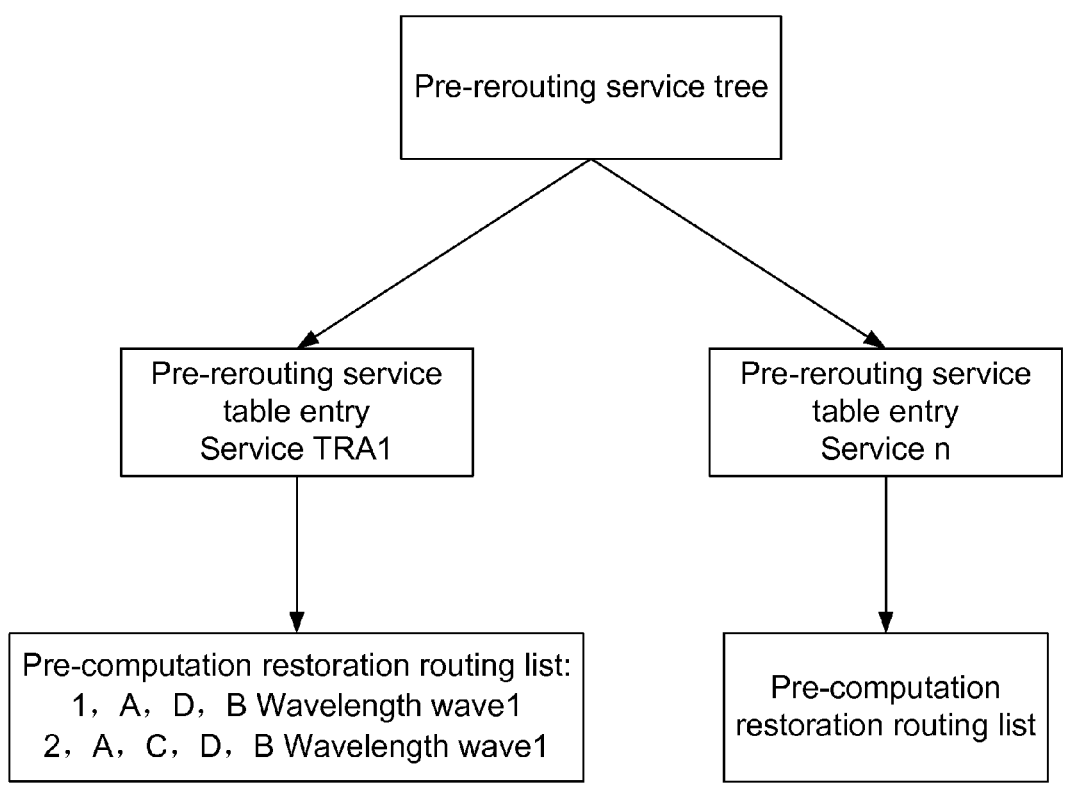
FIG. 7 is a diagram showing the structure of a pre-rerouting service tree obtained by re-computation in one embodiment of the disclosure.

Step 42: The PCE reads an active restoration route re-computation request corresponding to the service TRA1 from the queue g_tSpontRstrRtCompQue where active restoration routes wait for computation, and re-computes the restoration routes and wavelengths available for the TRA1 after the change of the network according to the current network topology, resource availability as well as some necessary restoration route constraint conditions of the TRA1. Because the link between the C and B goes wrong, the re-computed restoration routes available for the TRA1 are: restoration route {A, D, B}, wavelength Wave1; restoration route {A, C, D, B}, wavelength Wave1. Then, the PCE updates the list for restoration routes in the pre-rerouting table entry corresponding to the TRA1, and the updated result is shown in FIG. 7.

Step 43: The PCE continues to read a next restoration route computation request from the queue g_tRstrRtCompQue where the active restoration routes wait for computation, and ends the operation when finding that the queue is empty.

In the disclosure, the computation process for the restoration routes is basically a simple searching and matching process, so that the speed is very high, and the restoration speed of the service is greatly improved.

Of course, the disclosure also has various other embodiments, and various corresponding change and modification may be made by those skilled in the art without departing from the spirit and essence of the disclosure, but those change and modification should be within the protection scope of the appended claims of the disclosure.

INDUSTRIAL APPLICABILITY

Through the disclosure, the restoration efficiency of the service can be obviously improved, and the route computation time for the restoration of many services caused by a network fault is reduced.

The invention claimed is:

1. A method for improving a service restoration speed in a transmission network, comprising:
   in a service set-up process, receiving, by a Path Computation Element (PCE), a route computation request including restoration attributes and constraint conditions from a Path Computation Client (PCC), and computing and saving restoration routes available for the service according to the constraint conditions; and when a restoration route computation request for the service from the PCC is received, selecting, by the PCE, a route from the restoration routes locally saved and available for the service according to selection conditions included in the restoration route computation request, and sending the route to the PCC which restores the service via the received route;

wherein, the PCE is preset with a pre-rerouting service tree; and the method further comprising: saving, by the PCE, a corresponding relationship between service identifier information of the service and the computed restoration routes available for the service in the pre-rerouting service tree;

wherein, the step of the PCE saving the restoration routes available for the service comprises: after obtaining the restoration routes available for the service through computation, the PCE creating a list for pre-computed restoration routes, and saving the restoration routes available for the service in the list; and the step of the PCE saving the corresponding relationship between the service identifier information of the service and the computed restoration routes available for the service in the pre-rerouting service tree comprises: the PCE saving the corresponding relationship between a head of the list for the pre-computed restoration routes and the service identifier information of the service in the pre-rerouting service tree by taking the corresponding relationship as a pre-rerouting service table entry.

2. The method according to claim 1, further comprising: saving, by the PCE, the constraint conditions; wherein, after receiving the restoration route computation request from the PCC, if no local restoration route which meets the selection conditions is available for the service, the PCE re-computes restoration routes available for the service according to the selection conditions and the constraint conditions locally saved.

3. The method according to claim 1, further comprising: when multiple restoration route computation requests are received, processing, by the PCE, the multiple restoration route computation requests according to a priority order of the services related to the multiple restoration route computation requests.

4. The method according to claim 1, further comprising: when a network topology is changed, updating, by the PCE, actively the restoration routes locally saved and available for each service.

5. The method according to claim 4, wherein the step of the PCE actively updating the restoration routes locally saved and available for each service comprises:

after receiving a notification message of updating a network topology or updating a link resource, the PCE re-computing restoration routes available for services of the updated link resource related to the restoration routes locally saved and available for each service, and saving the re-computed restoration routes available for each service; and the re-computation of the restoration routes is performed according to the locally saved constraint conditions of corresponding services and updating information of the link resource.

6. The method according to claim 5, further comprising: computing, by the PCE, the restoration routes available for multiple services according to a priority order of the multiple services, when re-computing the restoration routes available for the multiple services.

7. The method according to claim 4, further comprising: computing, by the PCE, the restoration routes available for multiple services according to a priority order of the multiple services, when re-computing the restoration routes available for the multiple services.

8. A Path Computation Element (PCE) supporting an improvement of a service restoration speed in a transmission network, being configured to:

in a service set-up process, receive a route computation request including restoration attributes and constraint conditions from a Path Computation Client (PCC), then compute and save the restoration routes available for the service according to the included constraint conditions;

when a restoration route computation request for the service from the PCC is received, select a route from the restoration routes locally saved and available for the service according to selection conditions included in the restoration route computation request, and send the route to the PCC which restores the service via the received route;

save a corresponding relationship between identifier information of the service and the computed restoration routes available for the service in a pre-rerouting service tree; and after obtaining the restoration routes available for the service through computation, create a list for pre-computed restoration routes and save the computed result to the list, and save a corresponding relationship between a head of the list and the service identifier information of the service in the pre-rerouting service tree by taking the corresponding relationship as a pre-rerouting service table entry.

9. The PCE according to claim 8, being further configured to save the constraint conditions; wherein, after receiving the restoration route computation request from the PCC, if no local restoration route which meets the selection conditions is available for the service, the PCE re-computes restoration routes available for the service according to the selection conditions and the constraint conditions locally saved.

10. The PCE according to claim 8, being further configured to:

when multiple restoration route computation requests are received, process the multiple restoration route computation requests according to a priority order of the services related to the multiple restoration route computation requests.

11. The PCE according to claim 8, being further configured to actively update the restoration routes locally saved and available for each service when a network topology is changed.

12. The PCE according to claim 11, being further configured to:

after receiving a notification message of updating a network topology or updating a link resource, re-compute the restoration routes available for services of the updated link resource related to the restoration routes locally saved and available for each service, according to the locally saved constraint conditions of corresponding services and updating information of the link resource, and save the re-computed restoration routes available for each service.

13. The PCE according to claim 12, being further configured to compute restoration routes available for the services according to a priority order of the services, when re-computing restoration routes available for multiple services.

14. The PCE according to claim 11, being further configured to compute restoration routes available for the services according to a priority order of the services, when re-computing restoration routes available for multiple services.

* * * * *